US012793297B2

(12) United States Patent
Wall et al.

(10) Patent No.: US 12,793,297 B2
(45) Date of Patent: Nov. 10, 2026

(54) SYSTEM AND METHOD FOR ENABLING APPLICATION OF DESIGN STYLES TO A MOTION DESIGN

(71) Applicant: WARNERMEDIA DIRECT, LLC, New York, NY (US)

(72) Inventors: Matthew Jarvis Wall, New York, NY (US); Sean William Sullivan, New York, NY (US); Mark Brouwer, New York, NY (US); Richard Lalancette, New York, NY (US)

(73) Assignee: WarnerMedia Direct, LLC, New York, NY (US)

( * ) Notice: Subject to any disclaimer, the term of this patent is extended or adjusted under 35 U.S.C. 154(b) by 257 days.

(21) Appl. No.: 18/316,484

(22) Filed: May 12, 2023

(65) Prior Publication Data

US 2024/0378778 A1 Nov. 14, 2024

(51) Int. Cl.
*G06T 11/60* (2026.01)
*G06F 3/0482* (2013.01)
*G06T 11/40* (2006.01)

(52) U.S. Cl.
CPC ............ *G06T 11/60* (2013.01); *G06F 3/0482* (2013.01); *G06T 11/40* (2013.01)

(58) Field of Classification Search
CPC ......... G06T 11/60; G06T 11/40; G06F 3/0482
See application file for complete search history.

(56) References Cited

U.S. PATENT DOCUMENTS

2006/0010374 A1* 1/2006 Corrington ............... G06F 8/38 715/236
2008/0092057 A1* 4/2008 Monson .................. G06F 9/451 715/744
2010/0257182 A1* 10/2010 Saliba ................... G06F 40/253 707/747

(Continued)

OTHER PUBLICATIONS

"Custom Meu Feature Filter", WordPress.com Blog, published at https://wordpress.com/blog/2010/06/09/custom-menu-feature-filter/ as of Jun. 9, 2010, and archived as of Sep. 19, 2020 at archive.org (Year: 2020).*

*Primary Examiner* — William A Beutel
(74) *Attorney, Agent, or Firm* — Bookoff McAndrews, PLLC

(57) ABSTRACT

Systems, computing platforms, methods, and storage media for enabling application of design styles to a motion design are disclosed. Exemplary implementations may: obtain a design application output file for use with a motion graphics application; provide a user interface associated with the motion graphics application; and in response to selection of one of the plurality of user interface components, output style application instructions to apply the style attributes associated with the selected user interface component to a motion graphics project. Exemplary implementations, which may be implemented as a motion graphics application plugin, may facilitate or automate the transfer of style attributes from a designer's work in a design application to a developer's work in a motion graphics application. Exemplary implementations may obtain an indication of modification of the design application output file, and automatically update any affected user interface components for use in the motion graphics application.

20 Claims, 9 Drawing Sheets

(56) References Cited

U.S. PATENT DOCUMENTS

| | | | | |
|---|---|---|---|---|
| 2012/0278700 | A1* | 11/2012 | Sullivan | G06F 16/986 715/235 |
| 2013/0332916 | A1* | 12/2013 | Chinn | G06F 8/65 717/169 |
| 2014/0089789 | A1* | 3/2014 | Schowtka | G06F 40/186 715/243 |
| 2015/0378714 | A1* | 12/2015 | Katariya | H04L 67/34 717/170 |
| 2016/0231997 | A1* | 8/2016 | Mihara | H04N 21/4586 |
| 2018/0143741 | A1* | 5/2018 | Uriostegui | G06F 16/48 |

* cited by examiner

SYSTEM AND METHOD FOR ENABLING APPLICATION OF DESIGN STYLES TO A MOTION DESIGN

FIELD

The present disclosure relates to motion graphics, including but not limited to computing platforms, methods, and storage media for enabling application of design styles to a motion design.

BACKGROUND

The digital design and development process includes the design of user interfaces, visual effects, and motion graphics. Application, web, and graphic designers and developers often manually input or perform changes and updates to their products.

Designers typically have primary responsibility for the visual look and feel of a user interface component. Developers then typically use what designers have produced, and develop the back-end functionality and coding to provide desired functionality, for example in the case of a motion graphics or motion design application.

There is often a lack of communication or collaboration between designers and developers. The collaboration that does exist between designers and developers is often inefficient, not automated, not synchronized, and lacks functional traceability.

Improvements are desirable, for example in the situation where there is a change to a design style used by a designer that is then to be applied to a motion design.

SUMMARY

One aspect of the present disclosure relates to a system or computing platform configured for enabling application of design styles to a motion design. The system may include a non-transitory computer-readable storage medium having executable instructions embodied thereon. The system may include one or more hardware processors configured to execute the instructions. The processor(s) may execute the instructions to obtain a design application output file for use with a motion graphics application. The design application output file may define a plurality of style attributes. The processor(s) may execute the instructions to provide a user interface associated with the motion graphics application. The user interface may visually present a plurality of user interface components each associated with one or more of the plurality of style attributes. The processor(s) may execute the instructions to, in response to selection of one of the plurality of user interface components, output style application instructions to apply the style attributes associated with the selected user interface component to a motion graphics project.

Another aspect of the present disclosure relates to a method for enabling application of design styles to a motion design. The method may include obtaining a design application output file for use with a motion graphics application. The design application output file may define a plurality of style attributes. The method may include providing a user interface associated with the motion graphics application. The user interface may visually present a plurality of user interface components each associated with one or more of the plurality of style attributes. The method may include, in response to selection of one of the plurality of user interface components, outputting style application instructions to apply the style attributes associated with the selected user interface component to a motion graphics project.

Yet another aspect of the present disclosure relates to a non-transitory computer-readable storage medium having instructions embodied thereon, the instructions being executable by one or more processors to perform a method for enabling application of design styles to a motion design. The method may include obtaining a design application output file for use with a motion graphics application. The design application output file may define a plurality of style attributes. The method may include providing a user interface associated with the motion graphics application. The user interface may visually present a plurality of user interface components each associated with one or more of the plurality of style attributes. The method may include, in response to selection of one of the plurality of user interface components, outputting style application instructions to apply the style attributes associated with the selected user interface component to a motion graphics project.

BRIEF DESCRIPTION OF THE DRAWINGS

Embodiments of the present disclosure will now be described, by way of example only, with reference to the attached Figures.

DETAILED DESCRIPTION

Figure 1:
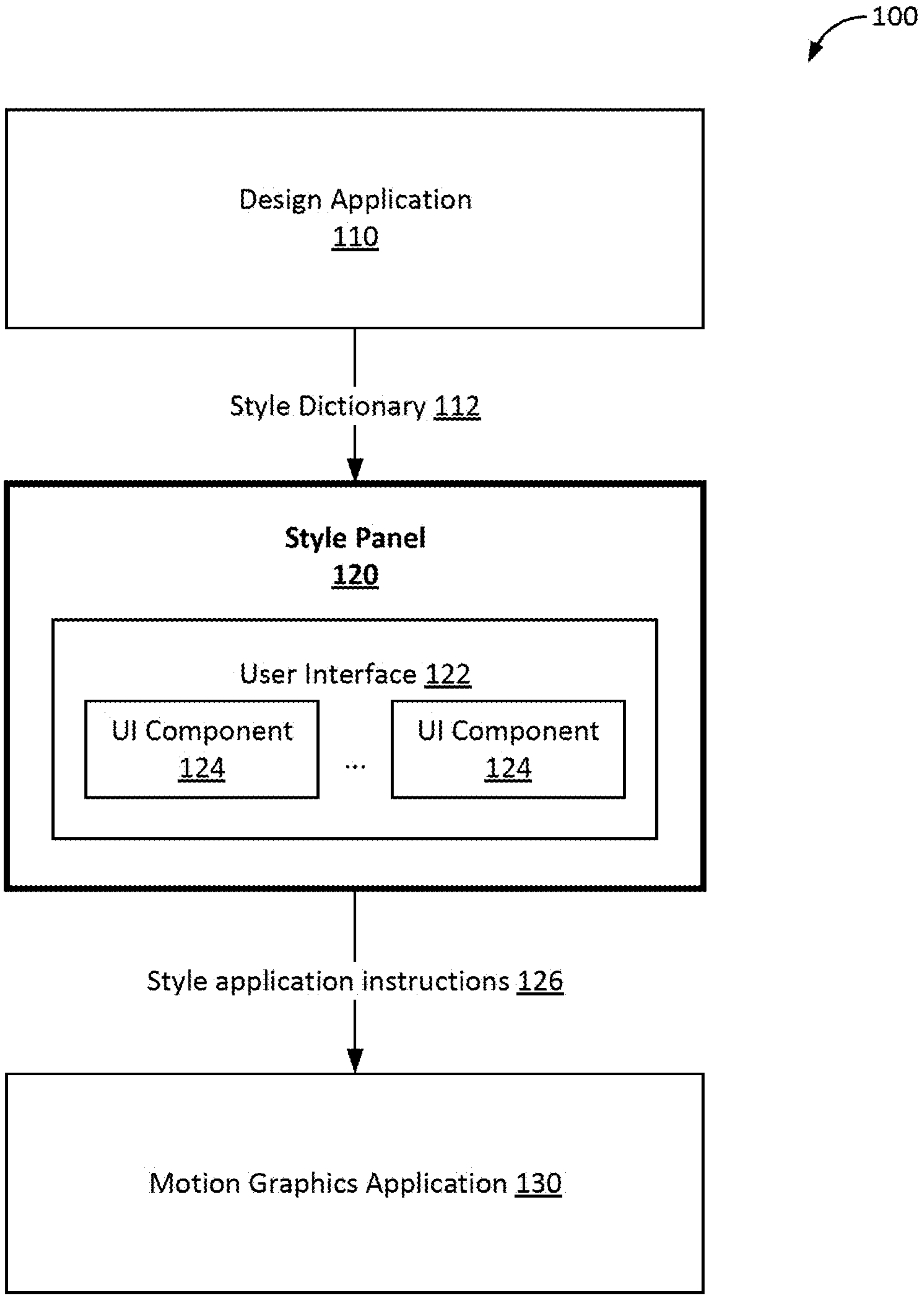
FIG. 1 illustrates a system for enabling application of design styles to a motion design, for example including a style panel, in accordance with one or more embodiments.

Systems, computing platforms, methods, and storage media for enabling application of design styles to a motion design are disclosed. Exemplary implementations may: obtain a design application output file for use with a motion graphics application; provide a user interface associated with the motion graphics application; and in response to selection of one of the plurality of user interface components, output style application instructions to apply the style attributes associated with the selected user interface component to a motion graphics project. Exemplary implementations, which may be implemented as a motion graphics application plugin, and may facilitate or automate the transfer of style attributes from a designer's work in a design application to a developer's work in a motion graphics application. Exemplary implementations may obtain an indication of modification of the design application output file, and automatically update any affected user interface components for use in the motion graphics application.

Tools are disclosed to provide one or more of improvement, automation, and synchronization of various steps in the design and development pipeline of motion graphics projects. In accordance with one or more embodiments, improvement is achieved by providing a means to facilitate the transfer of style attributes designed at a first stage of the development process, for example by a designer, to a second traditionally disconnected stage of the process, for example involving a developer, that operates with different formatting parameters. This may remove the requirement to manually match the designed style to implement updates across disconnected stages.

Embodiments of the present disclosure may provide consistent and improved design flow via a computer-implemented method to obtain the style attributes from a design application and make the style attributes accessible to be applied to the development of a motion graphics project.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 illustrates a system for enabling application of design styles to a motion design, for example including a style panel, in accordance with one or more embodiments. An overall environment 100 comprises a design application 110, which may be a collaborative interface design tool, such as Figma™. The environment 100 also comprises a motion graphics application 130, such as Adobe™ After Effects. The environment 100 comprises a system 120, which may be referred to as, or may be configured to provide, a style panel. The system 120 is configured to facilitate communication between the design application 110 and the motion graphics application 130.

The system 120 may include a non-transitory computer-readable storage medium having executable instructions embodied thereon. The system 120 may include one or more hardware processors configured to execute the instructions. The processor(s) may execute the instructions to obtain a design application output file, for example from the design application 110, for use with the motion graphics application 130. The design application output file may define a plurality of style attributes, and may comprise a style dictionary 112. A style dictionary may define styles once and in a single file, such that another platform may use the style dictionary to import the defined design styles. The design application output file may be provided in any suitable format, such as a text file or a JavaScript Object Notation (JSON) format. The extracted data may be converted from a native design application format to an alternative format, such as a JSON file, when saved and stored externally from the design application. This may facilitate the application of the design style attributes to user interface components found in other applications, such as the motion graphics application 130.

The processor(s) may execute the instructions to provide a user interface 122 associated with the motion graphics application. The user interface 122 may visually present a plurality of user interface components 124 each associated with one or more of the plurality of style attributes. The user interface 122 and the plurality of user interface components 124 may together be referred to as a style panel, or a style panel user interface, provided in accordance with one or more embodiments. The processor(s) may execute the instructions to, in response to selection of one of the plurality of user interface components 124, output style application instructions 126 to apply the style attributes associated with the selected user interface component to a motion graphics project. The style application instructions 126 may then be used by the motion graphics application 130 to apply the style attributes to the motion graphics project.

The system 120 may be configured to generate the style application instructions based on data associated with the selection of the one or more of the plurality of user interface components. For example, in response to selection or actuation of a user interface component to apply a design style in the motion graphics application 130, the system 120 may be configured to generate style application instructions associated with that selection and with the selected design style to be applied. In an example implementation, the motion graphics application 130 uses the style application instructions to apply the design style to one or more elements in the motion graphics application.

The system 120 may be configured to generate the style application instructions based on data associated with the selection of the one or more of the plurality of user interface components 124. The system 120 may be configured to output the style application instructions for application of the one or more of the plurality of style attributes to a plurality of motion graphics elements within the motion graphics project.

The system 120 may be configured to provide a means to apply pre-formulated data relating to design style attributes to the user interface components of a motion graphics application. The system 120 may be implemented as a plugin associated with the motion graphics application 130. The system 120 may operate as an integrated function in the motion graphics application 130. The system 120 may enable a motion graphics application user to access data originally generated in a design application. Such data may be extracted, for example as a style dictionary 112, stored, then imported into the motion graphics application 130, to define the attributes of the user interface components. The system 120 may be configured to provide the user interface such that the style attributes in the style dictionary are visually associated with a style application attribute in a format compatible with the motion graphics project.

In an example embodiment, the system 120 may alter an imported dataset for the purpose of reintegration into another application. Embodiments of the present disclosure prepare that data to be consumed in various ways, one of which is the direct input into a motion graphics application. Embodiments of the present disclosure put the infrastructure in place to allow for the extraction, translation, access and use of one dataset that was created through one application and applied in another. For example, the plurality of style attributes in the design application output file 112 may be defined in relation to a first data format. The system 120 may be configured to translate the plurality of style attributes defined in relation to the first data format, into a second plurality of style attributes defined in relation to a second data format used by the motion graphics application. The user interface 122 may visually present a plurality of user interface components 124 each associated with one or more of the second plurality of style attributes, such that the displayed style attributes can be applied to the generated style application instructions in the second data format.

In an example implementation using the context of colour matching. Embodiments of the present disclosure allow a user to extract the data set created in the design application used to define the colour of one component, for example a button. The user is able to access the extracted data set through the system 120, which may be provided as a plugin to the motion graphics application 130, and apply it to an entirely different component, for example a background layer to a motion graphics project. To facilitate this transfer the embodiment converts the colour specification from the HEX code used in design application, where the HEX code is a first data format, to the RGB colour code required for the motion graphics application, which is a second data format. After this initial assignment of the pre-designed colour to the component in the motion graphics application, the color's data value and the new component may remain linked until disassociated. The user does not need to manually match the colour for this initial design or for any subsequent updates to the design colour.

In an example embodiment, the system 120 comprises a style attribute translation database. The style attribute translation database may comprise a mapping between a first plurality of style attributes in a first data format associated with a design application and a second plurality of style attributes in a second data format associated with a motion graphics application. The system 120 may be configured to translate, using the style attribute translation database, the first plurality of style attributes defined in the design application output file into the second plurality of style attributes in the second data format associated with the motion graphics application. Contents of the style attribute translation database may be populated based on prior translations from the first data format to the second data format, and/or based on prior knowledge of how to translate a particular style attribute from the first data format to the second data format.

Figure 2A:
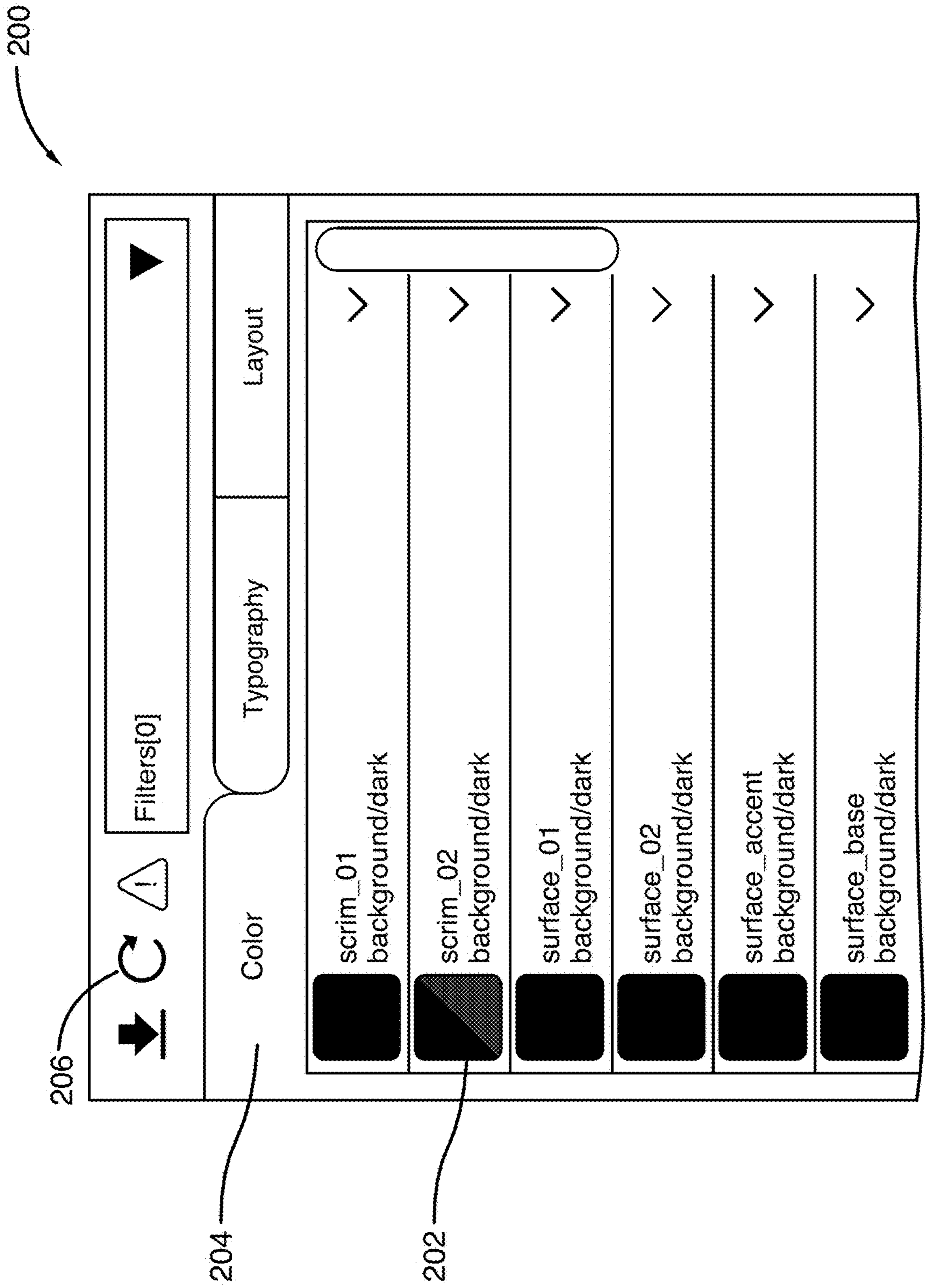
FIG. 2A and FIG. 2B illustrate a user interface comprising a style panel, in accordance with one or more embodiments.
Figure 2B:
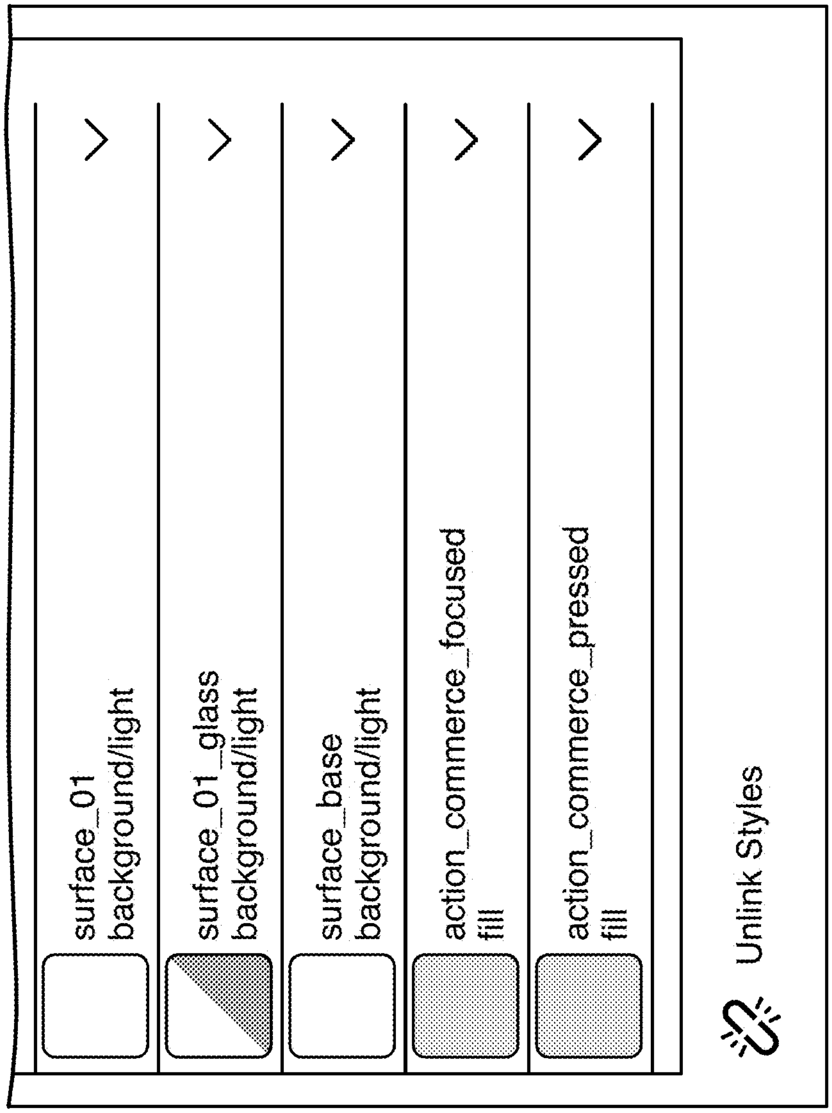

FIG. 2A and FIG. 2B illustrate a user interface 200 comprising a style panel, in accordance with one or more embodiments. The user interface 200 comprises a plurality of user of user interface components 202 each associated with one or more of the plurality of style attributes. The user interface 200 including the plurality of user interface components 202 may together be referred to as a style panel, or a style panel user interface, provided in accordance with one or more embodiments. A processor may execute instructions to, in response to selection of one of the plurality of user interface components 202, output style application instructions to apply the style attributes associated with the selected user interface component to a motion graphics project. The style application instructions may then be used by the motion graphics application to apply the style attributes to the motion graphics project.

As shown in FIG. 2A and FIG. 2B, the plurality of user interface components may define or be associated with one or more of a plurality of style attributes. For example, the user interface component 202 comprises a style name "scrim_02", a style group "background/dark" and a style colour, which in this case comprises a colour indication where part of the colour indication is black and the other part is gray. The plurality of user interface components 202 may be provided such that a user may easily perform a visual scan of the available style attributes for application to a motion graphics project.

The user interface 200 may also comprise a plurality of style attribute types 204. The example embodiment shown in FIG. 2A and FIG. 2B illustrates a plurality of user interface components associated with a style attribute type of "Color". In another example embodiment, a different plurality of user interface components may be provided when the style attribute type of Typography or Layout is selected. The plurality of user interface components provided in association with the Typography style attribute type may define style attributes such as font family, font style, character spacing, paragraph spacing, and/or justification, among others. The plurality of user interface components provided in association with the Layout style attribute type may define style attributes such as paragraph alignment, position, and/or layer behaviour, among others. The plurality of user interface components provided in association with the Layout style attribute type may comprise other named values that may be copied to a clipboard and applied anywhere a user sees fit.

In an example implementation, the system 120 shown in FIG. 1 may proactively track any changes to the design application output file, and automatically update any associated or affected user interface components. This proactive tracking may involve regular or periodic checking of changes, for example by comparing a current version of the design application output file to a stored previous version of the design application output file. In an example implementation, the system 120 is configured to periodically query the design application output file to determine whether the design application output file has been modified. The system 120 may be configured to obtain an indication of a modification to the design application output file, and to automatically update one of the plurality of user interface components, or one or more of the plurality of style attributes, in response to the indication of the modification to the design application output file. For example, the system 120 may obtain modification data associated with one or more modifications to the design application output file, and automatically update one of the plurality of user interface components or one or more of the plurality of style attributes based on the modification data.

An indication of a modification to the design file may be based on a detected change in the output file size, or the data/time that the output file was last updated. In another embodiment, the system 120 may be configured to obtain an indication of a modification to the design file based on a notification from the design application that at least one style attribute has been changed in the design project associated with the design application output file. In this way, the system 120 can ensure that the output file is always up to date and includes the latest design or style attribute updates or changes.

The system 120 of FIG. 1 may be configured to provide an output file verification user interface component 206 as shown in FIG. 2A, for example as a button or other actuatable or selectable component. In an example implementation as shown in FIG. 2A, the output file verification user interface component 206 may comprise a refresh arrow symbol, or may alternatively comprise text that indicates or is associated with a refresh function. In response to actuation of the output file verification user interface component 206, the system 120 may be configured to initiate verification of whether the design application output file has been modified. In this way, the system 120 provides another approach, in addition to the automated regular or periodic checking, for a verification to be initiated of whether contents of the design output file have changed, in order to determine whether the style panel user interface and any associated underlying data needs to be updated. This can provide reassurance to a user that the latest version of the output file is being used, and may enable an update in an instance where an automated design output file update may have failed, for example due to a system failure or communications failure associated with the automatic process.

In the event of any modification of the design style attributes in the design application, a new data set may be extracted, for example in response to detection of modification of a design output file. The modified design output file may be reintegrated into the motion graphics application. This method of linking the data set allows for the updates or changes to style attributes made to the user components in the design application to be applied to the corresponding components in the motion graphics application.

In an embodiment, the present disclosure provides a means of refreshing the data. In an example embodiment, the method used to access the extracted data set during the initial importation may be configured to create a connection that remains in place. This connection, or design application output connection, may be used to access subsequent updates to the design application output file that is exported from the design application and saved to the same location.

Figure 3:
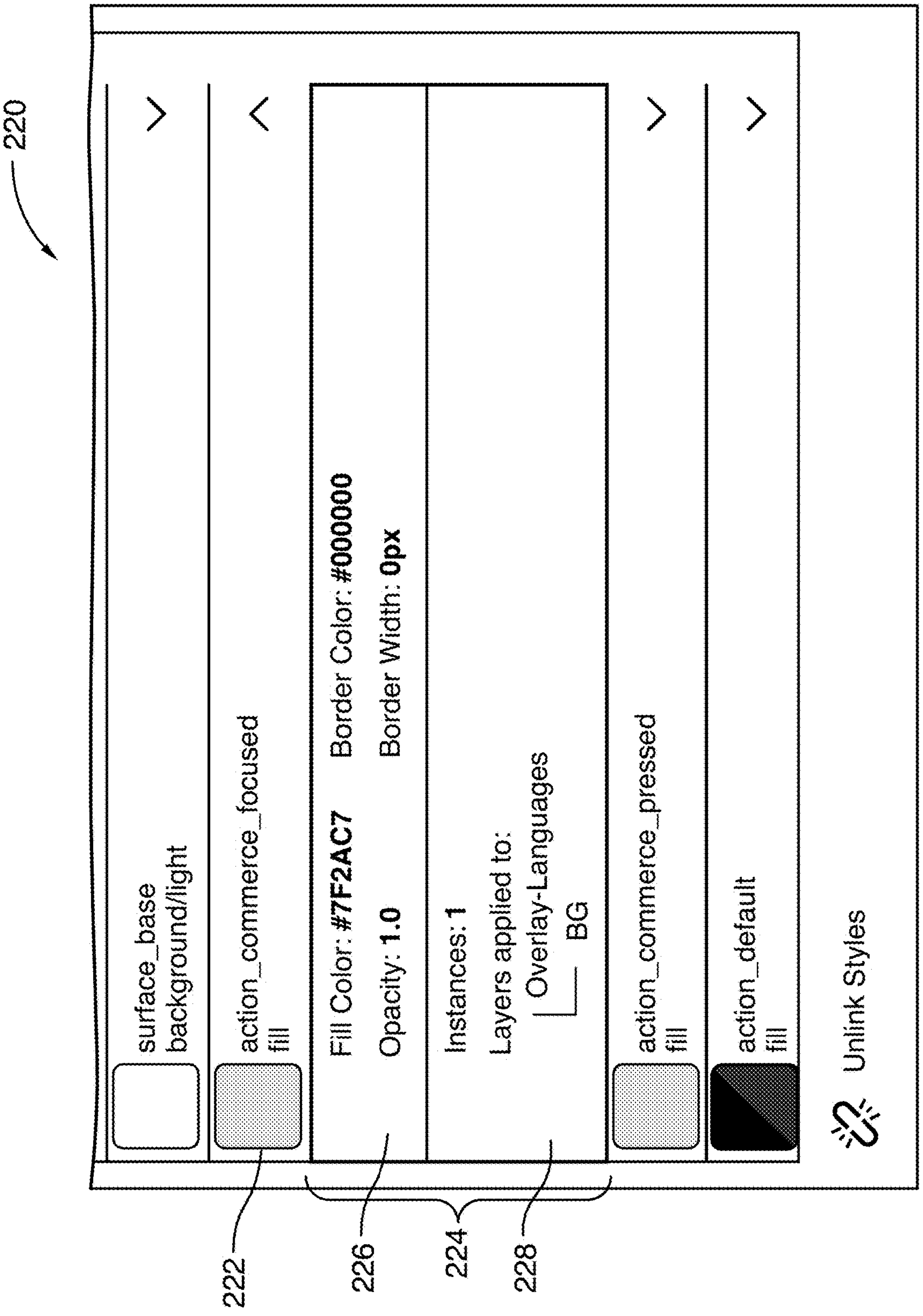
FIG. 3 illustrates a user interface based on the user interface of FIG. 2A and additionally featuring a style detail expansion, in accordance with one or more embodiments.

FIG. 3 illustrates a user interface 220, based on the user interface 200 of FIG. 2A and additionally featuring a style detail expansion, in accordance with one or more embodiments. As shown in FIG. 3, a user interface component 222 comprises a style name "action_commerce_focused", a style group "fill" and a style colour, which in this case corresponds to a purple colour. The user interface 220 of FIG. 3 further comprises a style detail expansion 224, which may be shown by actuating or clicking on any part of the user interface component 222; for example, clicking on the arrow to the right of the user interface component 222 may toggle between expanding and collapsing the style detail expansion 224.

As shown in FIG. 3, the style detail expansion 224 may provide a number of additional style details 226 and may provide linking information 228. The additional style details 226 may assist a user in differentiating between user interface components that may appear somewhat similar without the expansion. The linking information 228 may describe what the style is linked to in the motion graphics application. In the style detail expansion 224, the additional style details 226 may also provide a user with a visual indication corresponding to style attributes. The linking information 228 may provide information corresponding to behaviours. In the example of FIG. 3, the style detail expansion 224 comprises additional style details 226 including: Fill Color #7F2AC7, Border Color #000000, Opacity: 1.0, Border Width 0px. In the example of FIG. 3, the style detail expansion 224 comprises linking information 228 including: instances: 1, layers applied to: overlay-languages, BG. In other embodiments, different style details may be provided relating to style attributes or behaviors.

In an example embodiment, the additional style details in the style detail expansion 224 are provided in a format used by the motion graphics application. These additional style details in the motion graphics application format may have undergone a transformation or translation from a first format originally defined in the design application.

Figure 4:
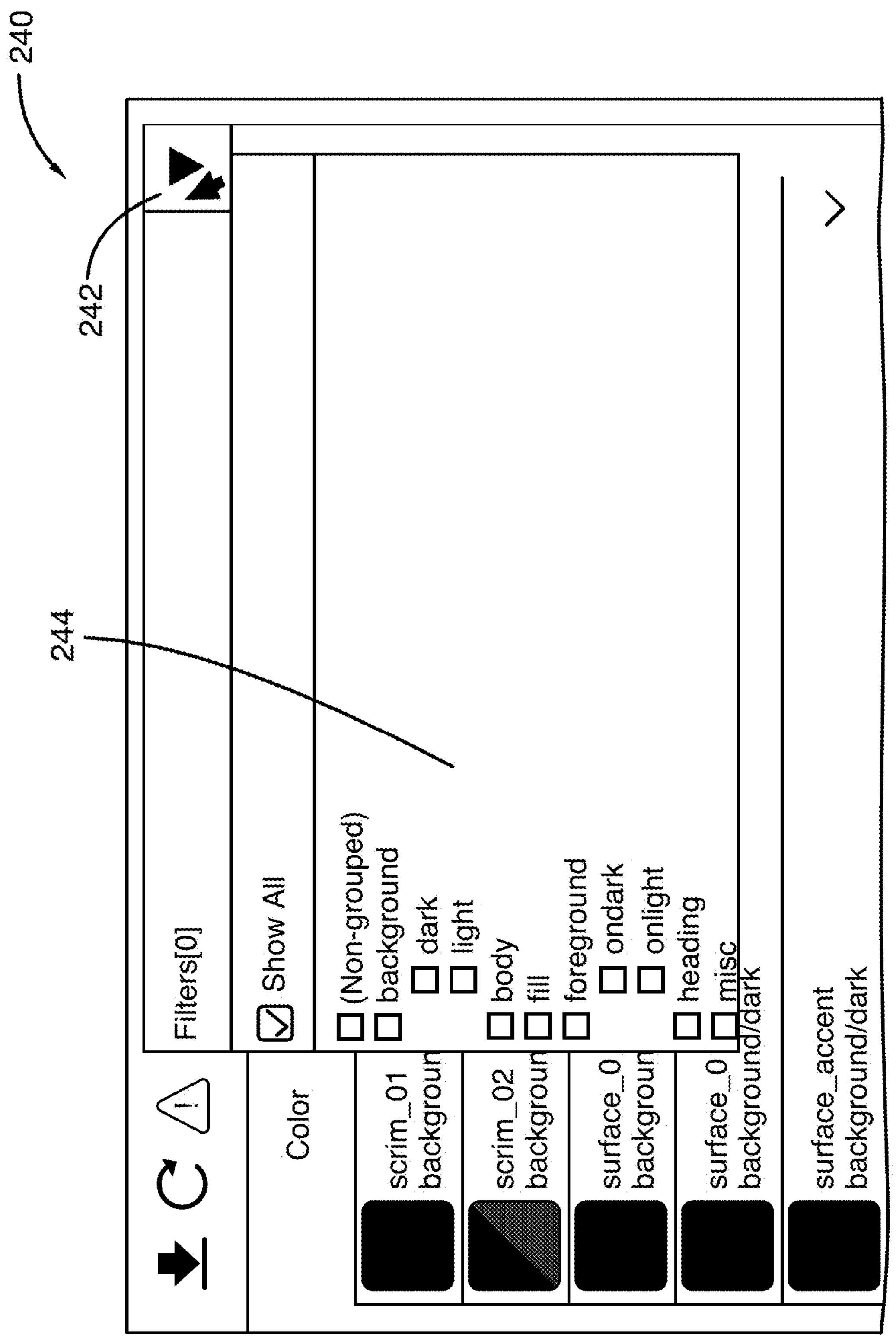
FIG. 4 illustrates a user interface based on the user interface of FIG. 2B and additionally featuring a filter function, in accordance with one or more embodiments.

FIG. 4 illustrates a user interface 240, based on the user interface 200 of FIG. 2B and additionally featuring a filter function, in accordance with one or more embodiments. The user interface 240 may use characterizations based on various features of the design attributes, that are a function of the data format, to filter and display the imported style attributes, which may facilitate viewing and selection. The example of FIG. 4 illustrates a filter user interface component 242 as part of the user interface 240. The user interface 240 of FIG. 4 further comprises a filter criteria expansion 244, which may be shown by actuating or clicking on any part of the filter user interface component 242; for example, clicking on the arrow to the right of the filter user interface component 242 may toggle between expanding and collapsing the filter criteria expansion 244.

As shown in FIG. 4, the filter criteria expansion 244 may provide a number of criteria by which displayed style attributes may be filtered, for example to only show a subset of style attributes meeting one or more criteria. The filter criteria may assist a user in differentiating between user interface components that may appear somewhat similar without the filtering. In the example shown in FIG. 4, the filter criteria expansion 244 comprises the following filter criteria: non-grouped, background (dark, light), body, fill, foreground (onDark, onLight), heading, misc. In other embodiments, more, fewer or different filter criteria may be provided.

In further embodiments, different filter criteria behaviour may be provided. For example, the filter user interface component 242 and the filter criteria expansion 244 of FIG. 4 permit concurrently selecting any number of filter criteria. In another embodiment, the user interface 240 may selectively restrict a user's ability to choose only one criteria within a group of criteria. For example, instead of providing checkboxes in all instances, the user interface 240 may provide radio buttons for a subset of filter criteria, so that a user may only select one of the criteria from the subset of filter criteria, as opposed to more than one.

Another aspect of the present disclosure relates to a user interface that facilitates the viewing, modification, and use of the imported design styles within the development application. Additional information related to the specific identification and codes of the design style attributes can be viewed through this interface. In an example embodiment, a style panel user interface comprises a modification function, such that imported design styles may be modified after importing. In another example embodiment, the style panel user interface prevents modification of imported design styles, to ensure consistency and so as not to depart from the intended design styles.

Another aspect of the present disclosure relates to a method of applying changes to the stylization of the user interface components in a development application, or motion graphics application, based on the data set extracted from a design application. The data values of the design style attributes may be linked and unlinked to the components within the motion graphics application. In another example embodiment, the system provides a viewable log of actions that were identified for being an inappropriate selection from the data set for the applicable component in the development application. For example, an action may be flagged when a selected style attribute does not correspond to the required format of the component it is assigned to, such as trying to apply a typography style to a shape.

Figure 5:
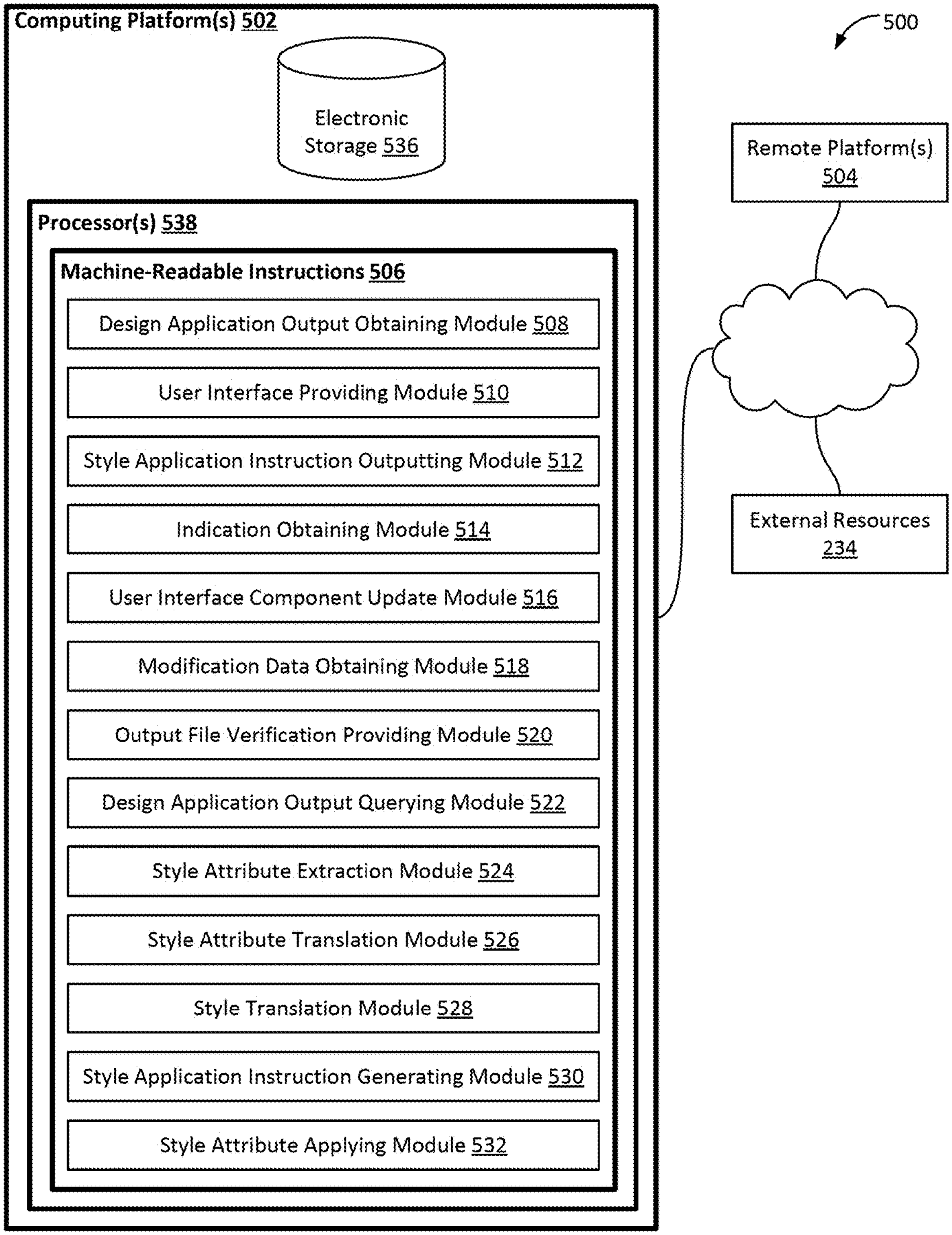
FIG. 5 illustrates another system configured for enabling application of design styles to a motion design, in accordance with one or more embodiments.

FIG. 5 illustrates a system 500 configured for enabling application of design styles to a motion design, in accordance with one or more embodiments. In some embodiments, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of design application output obtaining module 508, user interface providing module 510, style application instruction outputting module 512, indication obtaining module 514, user interface component update module 516, modification data obtaining module 518, output file verification providing module 520, design application output querying module 522, style attribute extraction module 524, style attribute translation module 526, style translation module 528, style application instruction generating module 530, style attribute applying module 532, and/or other instruction modules.

Design application output obtaining module 508 may be configured to obtain a design application output file for use with a motion graphics application. The method may be performed by a plug-in associated with the motion graphics application. The motion graphics application may include Adobe After Effects. The design application output file may define a plurality of style attributes.

User interface providing module 510 may be configured to provide a user interface associated with the motion graphics application. The user interface may visually present a plurality of user interface components each associated with one or more of the plurality of style attributes. User interface providing module 510 may be configured to provide a user interface to obtain data associated with the design application output file. User interface providing module 510 may be configured to provide the user interface such that the style attributes in the style dictionary are visually associated with a style application attribute in a format compatible with the motion graphics project.

User interface providing module 510 may be configured to provide the user interface including a first set of user interface components configured to provide a first set of styles to be applied to the motion graphics project. User interface providing module 510 may be configured to provide the user interface including a project element modification user interface component configured to modify one or more existing user interface components based on one or more of the plurality of style attributes. User interface providing module 510 may be configured to provide the user interface including a project element creation user interface component configured to create one or more new user interface components based on one or more of the plurality of style attributes.

Style application instruction outputting module 512 may be configured to, in response to selection of one of the plurality of user interface components, output style application instructions to apply the style attributes associated with the selected user interface component to a motion graphics project. Style application instruction outputting module 512 may be configured to output the style application instructions for application of the one or more of the plurality of style attributes to a plurality of motion graphics elements within the motion graphics project.

Indication obtaining module 514 may be configured to obtain an indication of a modification to the design application output file.

User interface component update module 516 may be configured to automatically update one of the plurality of user interface components or one or more of the plurality of style attributes in response to the indication of the modification to the design application output file.

User interface component update module 516 may be configured to automatically update one of the plurality of user interface components or one or more of the plurality of style attributes based on the modification data.

Modification data obtaining module 518 may be configured to obtain modification data associated with one or more modifications to the design application output file.

Output file verification providing module 520 may be configured to provide an output file verification user interface component, the actuation of which is configured to initiate verification of whether the design application output file has been modified.

Design application output querying module 522 may be configured to periodically query the design application output file to determine whether the design application output file has been modified.

Style attribute extraction module 524 may be configured to extract the style attributes from the design application output file.

Style attribute translation module 526 may be configured to translate the style attributes from a design application format into a format compatible with the motion graphics project.

Style translation module 528 may be configured to automatically translate the style attributes based on stored relationship data linking the design application format to the format compatible with the motion graphics project.

Style application instruction generating module 530 may be configured to generate the style application instructions based on data associated with the selection of the one or more of the plurality of user interface components. Style application instruction generating module 530 may be configured to generate the style application instructions based on data associated with the selection of the one or more of the plurality of user interface components. The data associated with the design application output file may include a uniform resource locator associated with the design application output file.

Style attribute applying module 532 may be configured to apply the one or more of the plurality of style attributes to a plurality of motion graphics elements within the motion graphics project.

In some implementations, verification of whether the style dictionary may have been modified includes determining whether a style dictionary file attribute has been modified or whether style dictionary file contents have been modified. In some implementations, the design application output file may include a style dictionary. In some implementations, the design application output file may include a Figma design file.

In some embodiments, computing platform(s) 502, remote platform(s) 504, and/or external resources 534 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 534 may be operatively linked via some other communication media.

A given remote platform 504 may include one or more processors configured to execute computer program modules. The computer program modules may be configured to enable an expert or user associated with the given remote platform 504 to interface with system 500 and/or external resources 534, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 534 may include sources of information outside of system 500, external entities participating with system 500, and/or other resources. In some embodiments, some or all of the functionality attributed herein to external resources 534 may be provided by resources included in system 500.

Computing platform(s) 502 may include electronic storage 536, one or more processors 538, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 536 may comprise non-transitory storage media that electronically stores information. The electronic storage media of electronic storage 536 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 536 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 536 may include one or more virtual storage resources (e.g., cloud storage, a virtual private network, and/or other virtual storage resources). Electronic storage 536 may store software algorithms, information determined by processor(s) 538, information received from computing platform(s) 502, information received from remote platform(s) 504, and/or other information that enables computing platform(s) 502 to function as described herein.

Processor(s) 538 may be configured to provide information processing capabilities in computing platform(s) 502. As such, processor(s) 538 may include one or more of a digital processor, an analog processor, a digital circuit designed to process information, an analog circuit designed to process information, a state machine, and/or other mechanisms for electronically processing information. Although processor(s) 538 is shown in FIG. 5 as a single entity, this is for illustrative purposes only. In some embodiments, processor(s) 538 may include a plurality of processing units. These processing units may be physically located within the same device, or processor(s) 538 may represent processing functionality of a plurality of devices operating in coordination. Processor(s) 538 may be configured to execute modules 508, 510, 512, 514, 516, 518, 520, 522, 524, 526, 528, 530, and/or 532, and/or other modules. Processor(s) 538 may be configured to execute modules 508, 510, 512, 514, 516, 518, 520, 522, 524, 526, 528, 530, and/or 532, and/or other modules by software; hardware; firmware; some combination of software, hardware, and/or firmware; and/or other mechanisms for configuring processing capabilities on processor(s) 538. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, 522, 524, 526, 528, 530, and/or 532 are illustrated in FIG. 5 as being implemented within a single processing unit, in embodiments in which processor(s) 538 includes multiple processing units, one or more of modules 508, 510, 512, 514, 516, 518, 520, 522, 524, 526, 528, 530, and/or 532 may be implemented remotely from the other modules. The description of the functionality provided by the different modules 508, 510, 512, 514, 516, 518, 520, 522, 524, 526, 528, 530, and/or 532 described below is for illustrative purposes, and is not intended to be limiting, as any of modules 508, 510, 512, 514, 516, 518, 520, 522, 524, 526, 528, 530, and/or 532 may provide more or less functionality than is described. For example, one or more of modules 508, 510, 512, 514, 516, 518, 520, 522, 524, 526, 528, 530, and/or 532 may be eliminated, and some or all of its functionality may be provided by other ones of modules 508, 510, 512, 514, 516, 518, 520, 522, 524, 526, 528, 530, and/or 532. As another example, processor(s) 538 may be configured to execute one or more additional modules that may perform some or all of the functionality attributed below to one of modules 508, 510, 512, 514, 516, 518, 520, 522, 524, 526, 528, 530, and/or 532.

Figure 6:
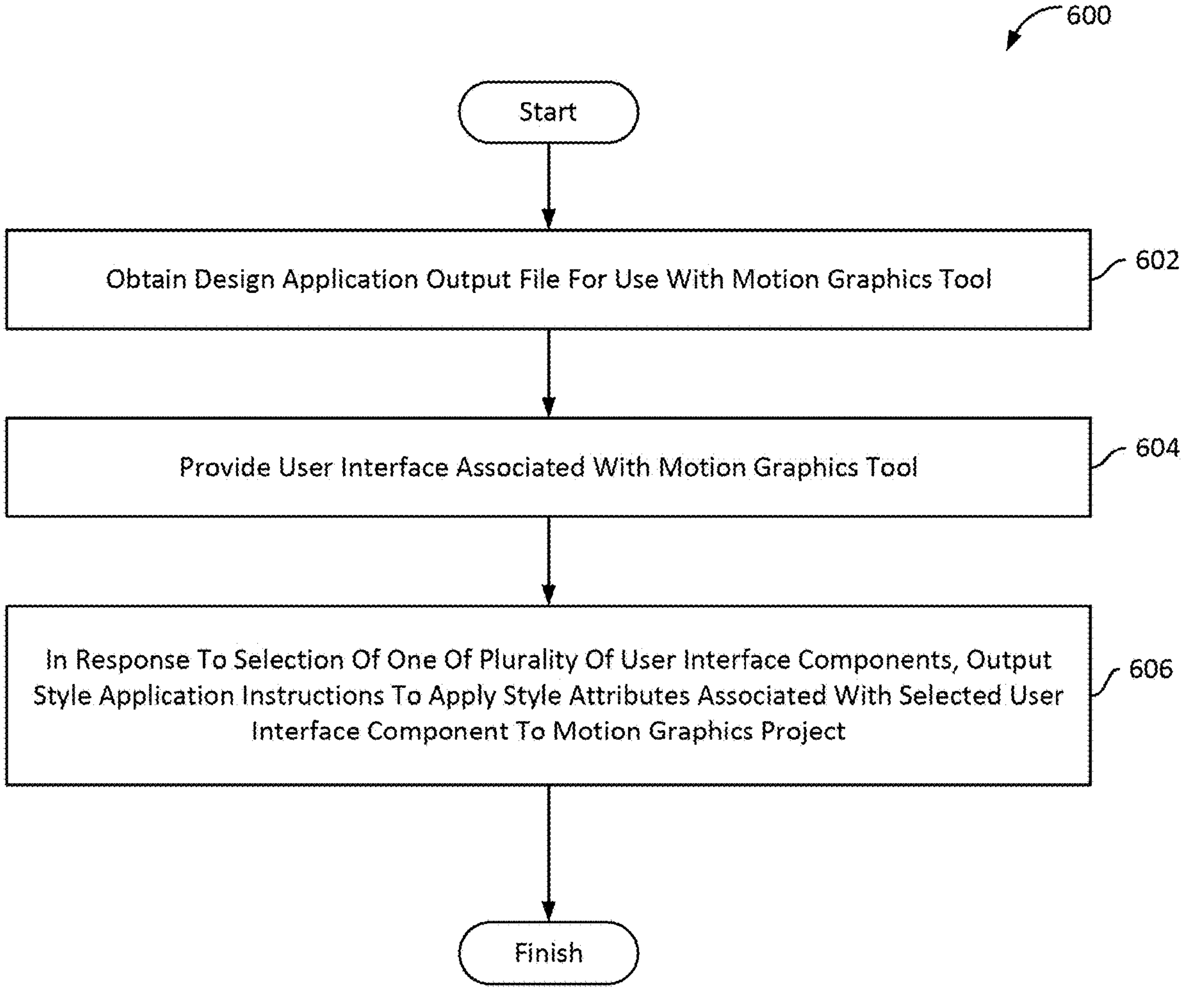
FIG. 6 illustrates a method for enabling application of design styles to a motion design, in accordance with one or more embodiments.

FIG. 6 illustrates a method 600 for enabling application of design styles to a motion design, in accordance with one or more embodiments. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

An operation 602 may include obtaining a design application output file for use with a motion graphics application. The design application output file may define a plurality of style attributes. Operation 602 may be performed by one or more hardware processors configured by machine-readable instructions including a module that is the same as or similar to design application output obtaining module 508, in accordance with one or more embodiments.

An operation 604 may include providing a user interface associated with the motion graphics application. The user interface may visually present a plurality of user interface components each associated with one or more of the plurality of style attributes. Operation 604 may be performed by one or more hardware processors configured by machine-readable instructions including a module that is the same as or similar to user interface providing module 510, in accordance with one or more embodiments.

An operation 606 may include in response to selection of one of the plurality of user interface components, outputting style application instructions to apply the style attributes associated with the selected user interface component to a motion graphics project. Operation 606 may be performed by one or more hardware processors configured by machine-readable instructions including a module that is the same as or similar to style application instruction outputting module 512, in accordance with one or more embodiments.

Figure 7:
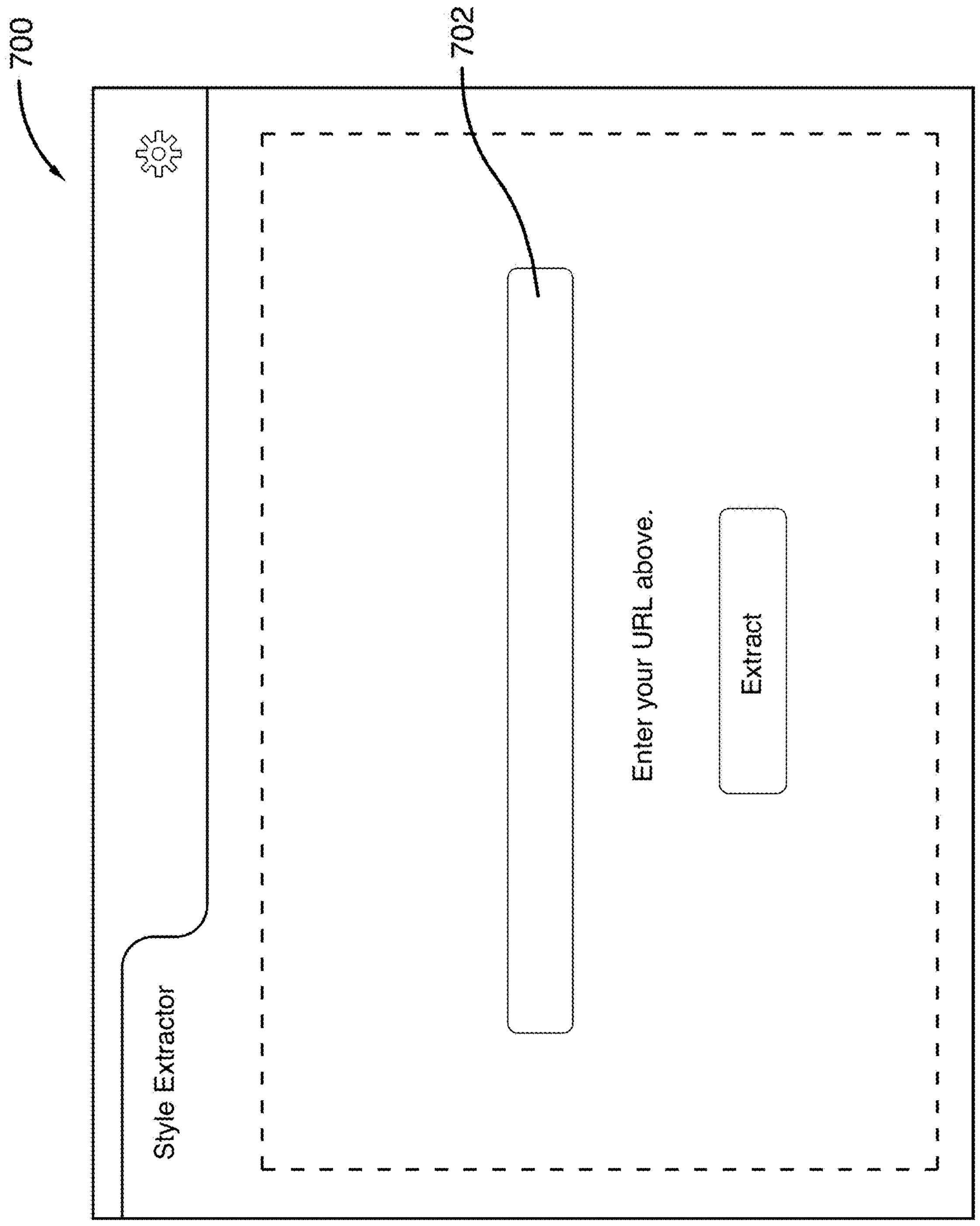
FIG. 7 illustrates a user interface comprising a style extractor main panel, in accordance with one or more embodiments.

FIG. 7 illustrates a user interface 700 comprising a style extractor main panel, in accordance with one or more embodiments. An aspect of the present disclosure as discussed in relation to FIG. 7 relates to a user interface configured for the initial importation of the data set, for example as shown in FIG. 6 and operation 602 including obtaining a design application output file for use with a motion graphics application. The importation and integration of the data defining the design style attributes is facilitated by the conversion of the data into values that correspond with the format requirements of the development application, as discussed herein.

The user interface 700 provides a means to access and extract data that defines designed styles from a design application output file, such as a style dictionary. This enables the user to save the design data to an external location for future use in other applications. The design styles may include data related to style attributes such as the colour, the typography, and the layout of user interface components. The user interface 700 may comprise include a data source identification 702, such as a field or text entry box, for the input of the location of the design style data. The data source identification 702 may be used to receive data input by a user to define an access path, such as a file location or uniform resource locator (URL) pointing to the design output file.

Figure 8:
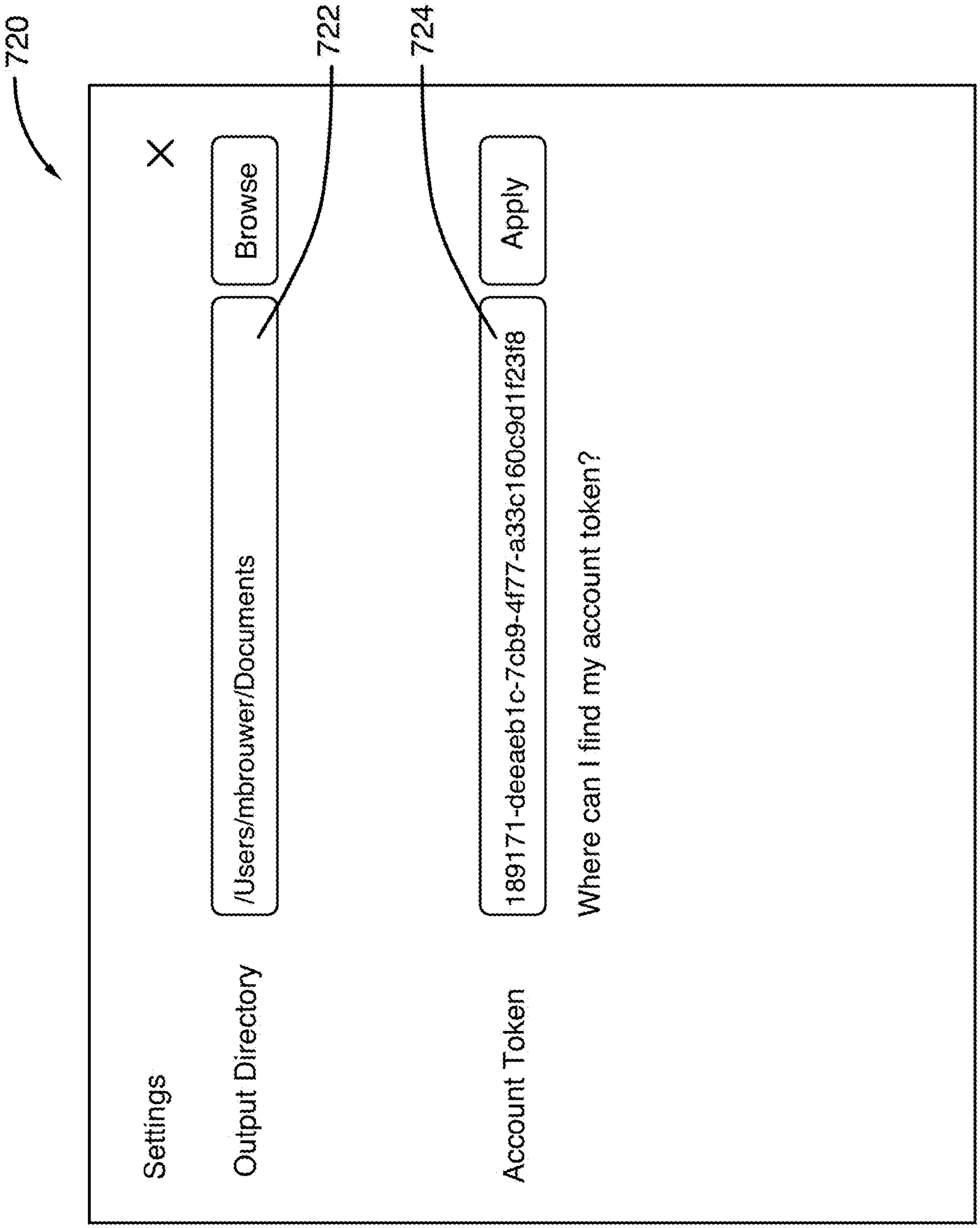
FIG. 8 illustrates a user interface comprising a style extractor settings panel, in accordance with one or more embodiments.

FIG. 8 illustrates a user interface 720 comprising a style extractor settings panel, in accordance with one or more embodiments. The user interface 720 may include an input field to assign the coordinates of a storage location for the extracted data. A design application output file locator 722 may be provided to specify the location of the design application output file. As shown in FIG. 8, the design application output file locator 722 may comprise a text field and a "Browse" button, using which a user may browse and locate the design application output file, and/or a user may directly input a URL or file location. The user interface 720 may also comprise an additional design application output file parameter 724, for example an account token that may be needed to authenticate a URL. In an example implementation in which the design application is Figma, the design application output file parameter may comprise a Figma account token. The user interface 720 may be used to enable execution of the extraction of the design styles from the design application based on the access path provided, and to save the data according to the linked storage location.

In an example implementation, the location of the design application output file is specified by the data source identification 702 in FIG. 7, and the style application instructions are output to a location specified by the output directory 722 in FIG. 8.

Embodiments of the present disclosure provide a method of facilitating efficient collaboration between a designer and a developer in the creation and maintenance of user interfaces, digital visual effects, and motion graphics. The underlying solution may be configured to provide a method of addressing differences and disconnects between data formats to facilitate the assigning of style design attributes across applications.

In an embodiment, a practical application of a style panel including user interface components may be provided as a plugin associated with a motion graphics application, and for use in conjunction with a design application, both of which are software applications. The plugin may be executed by one or more processors based on statements and instructions stored in a non-transitory machine-readable storage medium. In an implementation, this practical application leverages statements and instructions for execution by one or more processors to improve functioning of a processor implementing the plugin and/or the motion graphics application. The practical application of the plugin provides an improvement by displaying a plurality of user interface components that permit one or more of the style attributes from the design application to be viewed natively in a motion graphics application. The style attributes from the design application may automatically be applied to a motion graphics project, by generating and/or outputting style application instructions to apply the style attributes associated with the selected user interface component(s).

In some implementations of a system according to the present disclosure, one or more processors may be configured to translate, and optionally to automatically translate, style attributes in a design application output file to a format compatible with a motion graphics application, based on stored relationship data linking the design application format to the format compatible with the motion graphics project. Such translation, or automatic translation, by a system or method according to one or more embodiments reduces errors and improves operation of the system by ensuring accurate data is used for the motion graphics project, rather than relying on a user to attempt to emulate or translate the style attributes based on their knowledge or skill.

In an implementation, this practical application leverages statements and instructions for execution by one or more processors to automate obtaining or importing style attributes from a design application, and facilitate generating or outputting style application instructions to apply the style attributes associated with one or more selected user interface components to a motion graphics project. This automation may reduce errors associated with a user manually applying style attributes from a design application into a motion graphics application, which saves resource and processing costs associated with operating with erroneous data. This automation may also ensure greater reliability of obtained style attributes. This automation improve functioning of a processor implementing the plugin and/or the motion graphics application.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following CLAUSES, with specific features laid out in the dependent clauses:

One aspect of the present disclosure relates to a system configured for enabling application of design styles to a motion design. The system may include one or more hardware processors configured by machine-readable instructions. The processor(s) may be configured to obtain a design application output file for use with a motion graphics processor(s) may be configured to provide a user interface associated with the motion graphics application. The user interface may visually present a plurality of user interface components each associated with one or more of the plurality of style attributes. The processor(s) may be configured to, in response to selection of one of the plurality of user interface components, output style application instructions to apply the style attributes associated with the selected user interface component to a motion graphics project.

In some implementations of the system, the processor(s) may be configured to obtain an indication of a modification to the design application output file. In some implementations of the system, the processor(s) may be configured to automatically update one of the plurality of user interface components or one or more of the plurality of style attributes in response to the indication of the modification to the design application output file.

In some implementations of the system, the processor(s) may be configured to obtain modification data associated with one or more modifications to the design application output file. In some implementations of the system, the processor(s) may be configured to automatically update one of the plurality of user interface components or one or more of the plurality of style attributes based on the modification data.

In some implementations of the system, the processor(s) may be configured to provide an output file verification user interface component, the actuation of which is configured to initiate verification of whether the design application output file has been modified.

In some implementations of the system, the processor(s) may be configured to periodically query the design application output file to determine whether the design application output file has been modified.

In some implementations of the system, verification of whether the style dictionary may have been modified includes determining whether a style dictionary file attribute has been modified or whether style dictionary file contents have been modified.

In some implementations of the system, the processor(s) may be configured to extract the style attributes from the design application output file.

In some implementations of the system, the processor(s) may be configured to provide a user interface to obtain data associated with the design application output file.

In some implementations of the system, the data associated with the design application output file may include a uniform resource locator associated with the design application output file.

In some implementations of the system, the processor(s) may be configured to translate the style attributes from a design application format into a format compatible with the motion graphics project.

In some implementations of the system, the processor(s) may be configured to automatically translate the style attributes based on stored relationship data linking the design application format to the format compatible with the motion graphics project.

In some implementations of the system, the design application output file may include a style dictionary.

In some implementations of the system, the processor(s) may be configured to generate the style application instructions based on data associated with the selection of the one or more of the plurality of user interface components.

In some implementations of the system, the processor(s) may be configured to provide the user interface such that the style attributes in the style dictionary are visually associated with a style application attribute in a format compatible with the motion graphics project.

In some implementations of the system, the processor(s) may be configured to provide the user interface including a first set of user interface components configured to provide a first set of styles to be applied to the motion graphics project.

In some implementations of the system, the processor(s) may be configured to provide the user interface including a project element modification user interface component configured to modify one or more existing user interface components based on one or more of the plurality of style attributes.

In some implementations of the system, the processor(s) may be configured to provide the user interface including a project element creation user interface component configured to create one or more new user interface components based on one or more of the plurality of style attributes.

In some implementations of the system, the processor(s) may be configured to generate the style application instructions based on data associated with the selection of the one or more of the plurality of user interface components.

In some implementations of the system, the processor(s) may be configured to output the style application instructions for application of the one or more of the plurality of style attributes to a plurality of motion graphics elements within the motion graphics project.

In some implementations of the system, the processor(s) may be configured to apply the one or more of the plurality of style attributes to a plurality of motion graphics elements within the motion graphics project.

In some implementations of the system, the design application output file may include a style dictionary.

In some implementations of the system, the design application output file may include a Figma design file.

In some implementations of the system, the method may be performed by a plug-in associated with the motion graphics application.

In some implementations of the system, the motion graphics application may include Adobe After Effects.

Another aspect of the present disclosure relates to a method for enabling application of design styles to a motion design. The method may include obtaining a design application output file for use with a motion graphics application. The design application output file may define a plurality of style attributes. The method may include providing a user interface associated with the motion graphics application. The user interface may visually present a plurality of user interface components each associated with one or more of the plurality of style attributes. The method may include, in response to selection of one of the plurality of user interface components, outputting style application instructions to apply the style attributes associated with the selected user interface component to a motion graphics project.

In some implementations of the method, it may include obtaining an indication of a modification to the design application output file. In some implementations of the method, it may include automatically updating one of the plurality of user interface components or one or more of the plurality of style attributes in response to the indication of the modification to the design application output file.

In some implementations of the method, it may include obtaining modification data associated with one or more modifications to the design application output file. In some implementations of the method, it may include automatically updating one of the plurality of user interface components or one or more of the plurality of style attributes based on the modification data.

In some implementations of the method, it may include providing an output file verification user interface component, the actuation of which is configured to initiate verification of whether the design application output file has been modified.

In some implementations of the method, it may include periodically querying the design application output file to determine whether the design application output file has been modified.

In some implementations of the method, verification of whether the style dictionary may have been modified includes determining whether a style dictionary file attribute has been modified or whether style dictionary file contents have been modified.

In some implementations of the method, it may include extracting the style attributes from the design application output file.

In some implementations of the method, it may include providing a user interface to obtain data associated with the design application output file.

In some implementations of the method, the data associated with the design application output file may include a uniform resource locator associated with the design application output file.

In some implementations of the method, it may include translating the style attributes from a design application format into a format compatible with the motion graphics project.

In some implementations of the method, it may include automatically translating the style attributes based on stored relationship data linking the design application format to the format compatible with the motion graphics project.

In some implementations of the method, the design application output file may include a style dictionary.

In some implementations of the method, it may include generating the style application instructions based on data associated with the selection of the one or more of the plurality of user interface components.

In some implementations of the method, it may include providing the user interface such that the style attributes in the style dictionary are visually associated with a style application attribute in a format compatible with the motion graphics project.

In some implementations of the method, it may include providing the user interface including a first set of user interface components configured to provide a first set of styles to be applied to the motion graphics project.

In some implementations of the method, it may include providing the user interface including a project element modification user interface component configured to modify one or more existing user interface components based on one or more of the plurality of style attributes.

In some implementations of the method, it may include providing the user interface including a project element creation user interface component configured to create one or more new user interface components based on one or more of the plurality of style attributes.

In some implementations of the method, it may include generating the style application instructions based on data associated with the selection of the one or more of the plurality of user interface components.

In some implementations of the method, it may include outputting the style application instructions for application of the one or more of the plurality of style attributes to a plurality of motion graphics elements within the motion graphics project.

In some implementations of the method, it may include applying the one or more of the plurality of style attributes to a plurality of motion graphics elements within the motion graphics project.

In some implementations of the method, the design application output file may include a style dictionary.

In some implementations of the method, the design application output file may include a Figma design file.

In some implementations of the method, the method may be performed by a plug-in associated with the motion graphics application.

In some implementations of the method, the motion graphics application may include Adobe After Effects.

Yet another aspect of the present disclosure relates to a non-transitory computer-readable storage medium having instructions embodied thereon, the instructions being executable by one or more processors to perform a method for enabling application of design styles to a motion design.

The method may include obtaining a design application output file for use with a motion graphics application. The design application output file may define a plurality of style attributes. The method may include providing a user interface associated with the motion graphics application. The user interface may visually present a plurality of user interface components each associated with one or more of the plurality of style attributes. The method may include, in response to selection of one of the plurality of user interface components, outputting style application instructions to apply the style attributes associated with the selected user interface component to a motion graphics project.

In some implementations of the computer-readable storage medium, the method may include obtaining an indication of a modification to the design application output file. In some implementations of the computer-readable storage medium, the method may include automatically updating one of the plurality of user interface components or one or more of the plurality of style attributes in response to the indication of the modification to the design application output file.

In some implementations of the computer-readable storage medium, the method may include obtaining modification data associated with one or more modifications to the design application output file. In some implementations of the computer-readable storage medium, the method may include automatically updating one of the plurality of user interface components or one or more of the plurality of style attributes based on the modification data.

In some implementations of the computer-readable storage medium, the method may include providing an output file verification user interface component, the actuation of which is configured to initiate verification of whether the design application output file has been modified.

In some implementations of the computer-readable storage medium, the method may include periodically querying the design application output file to determine whether the design application output file has been modified.

In some implementations of the computer-readable storage medium, verification of whether the style dictionary may have been modified includes determining whether a style dictionary file attribute has been modified or whether style dictionary file contents have been modified.

In some implementations of the computer-readable storage medium, the method may include extracting the style attributes from the design application output file.

In some implementations of the computer-readable storage medium, the method may include providing a user interface to obtain data associated with the design application output file.

In some implementations of the computer-readable storage medium, the data associated with the design application output file may include a uniform resource locator associated with the design application output file.

In some implementations of the computer-readable storage medium, the method may include translating the style attributes from a design application format into a format compatible with the motion graphics project.

In some implementations of the computer-readable storage medium, the method may include automatically translating the style attributes based on stored relationship data linking the design application format to the format compatible with the motion graphics project.

In some implementations of the computer-readable storage medium, the design application output file may include a style dictionary.

In some implementations of the computer-readable storage medium, the method may include generating the style application instructions based on data associated with the selection of the one or more of the plurality of user interface components.

In some implementations of the computer-readable storage medium, the method may include providing the user interface such that the style attributes in the style dictionary are visually associated with a style application attribute in a format compatible with the motion graphics project.

In some implementations of the computer-readable storage medium, the method may include providing the user interface including a first set of user interface components configured to provide a first set of styles to be applied to the motion graphics project.

In some implementations of the computer-readable storage medium, the method may include providing the user interface including a project element modification user interface component configured to modify one or more existing user interface components based on one or more of the plurality of style attributes.

In some implementations of the computer-readable storage medium, the method may include providing the user interface including a project element creation user interface component configured to create one or more new user interface components based on one or more of the plurality of style attributes.

In some implementations of the computer-readable storage medium, the method may include generating the style application instructions based on data associated with the selection of the one or more of the plurality of user interface components.

In some implementations of the computer-readable storage medium, the method may include outputting the style application instructions for application of the one or more of the plurality of style attributes to a plurality of motion graphics elements within the motion graphics project.

In some implementations of the computer-readable storage medium, the method may include applying the one or more of the plurality of style attributes to a plurality of motion graphics elements within the motion graphics project.

In some implementations of the computer-readable storage medium, the design application output file may include a style dictionary.

In some implementations of the computer-readable storage medium, the design application output file may include a Figma design file.

In some implementations of the computer-readable storage medium, the method may be performed by a plug-in associated with the motion graphics application.

In some implementations of the computer-readable storage medium, the motion graphics application may include Adobe After Effects.

Still another aspect of the present disclosure relates to a system configured for enabling application of design styles to a motion design. The system may include means for obtaining a design application output file for use with a motion graphics application. The design application output file may define a plurality of style attributes. The system may include means for providing a user interface associated with the motion graphics application. The user interface may visually present a plurality of user interface components each associated with one or more of the plurality of style attributes. The system may include means for, in response to selection of one of the plurality of user interface components, outputting style application instructions to apply the style attributes associated with the selected user interface component to a motion graphics project.

In some implementations of the system, the system may include means for obtaining an indication of a modification to the design application output file. In some implementations of the system, the system may include means for automatically updating one of the plurality of user interface components or one or more of the plurality of style attributes in response to the indication of the modification to the design application output file.

In some implementations of the system, the system may include means for obtaining modification data associated with one or more modifications to the design application output file. In some implementations of the system, the system may include means for automatically updating one of the plurality of user interface components or one or more of the plurality of style attributes based on the modification data.

In some implementations of the system, the system may include means for providing an output file verification user interface component, the actuation of which is configured to initiate verification of whether the design application output file has been modified.

In some implementations of the system, the system may include means for periodically querying the design application output file to determine whether the design application output file has been modified.

In some implementations of the system, verification of whether the style dictionary may have been modified includes determining whether a style dictionary file attribute has been modified or whether style dictionary file contents have been modified.

In some implementations of the system, the system may include means for extracting the style attributes from the design application output file.

In some implementations of the system, the system may include means for providing a user interface to obtain data associated with the design application output file.

In some implementations of the system, the data associated with the design application output file may include a uniform resource locator associated with the design application output file.

In some implementations of the system, the system may include means for translating the style attributes from a design application format into a format compatible with the motion graphics project.

In some implementations of the system, the system may include means for automatically translating the style attributes based on stored relationship data linking the design application format to the format compatible with the motion graphics project.

In some implementations of the system, the design application output file may include a style dictionary.

In some implementations of the system, the system may include means for generating the style application instructions based on data associated with the selection of the one or more of the plurality of user interface components.

In some implementations of the system, the system may include means for providing the user interface such that the style attributes in the style dictionary are visually associated with a style application attribute in a format compatible with the motion graphics project.

In some implementations of the system, the system may include means for providing the user interface including a first set of user interface components configured to provide a first set of styles to be applied to the motion graphics project.

In some implementations of the system, the system may include means for providing the user interface including a project element modification user interface component configured to modify one or more existing user interface components based on one or more of the plurality of style attributes.

In some implementations of the system, the system may include means for providing the user interface including a project element creation user interface component configured to create one or more new user interface components based on one or more of the plurality of style attributes.

In some implementations of the system, the system may include means for generating the style application instructions based on data associated with the selection of the one or more of the plurality of user interface components.

In some implementations of the system, the system may include means for outputting the style application instructions for application of the one or more of the plurality of style attributes to a plurality of motion graphics elements within the motion graphics project.

In some implementations of the system, the system may include means for applying the one or more of the plurality of style attributes to a plurality of motion graphics elements within the motion graphics project.

In some implementations of the system, the design application output file may include a style dictionary.

In some implementations of the system, the design application output file may include a Figma design file.

In some implementations of the system, the method may be performed by a plug-in associated with the motion graphics application.

In some implementations of the system, the motion graphics application may include Adobe After Effects.

Even another aspect of the present disclosure relates to a computing platform configured for enabling application of design styles to a motion design. The computing platform may include a non-transitory computer-readable storage medium having executable instructions embodied thereon. The computing platform may include one or more hardware processors configured to execute the instructions. The processor(s) may execute the instructions to obtain a design application output file for use with a motion graphics processor(s) may execute the instructions to provide a user interface associated with the motion graphics application. The user interface may visually present a plurality of user interface components each associated with one or more of the plurality of style attributes. The processor(s) may execute the instructions to, in response to selection of one of the plurality of user interface components, output style application instructions to apply the style attributes associated with the selected user interface component to a motion graphics project.

In some implementations of the computing platform, the processor(s) may execute the instructions to obtain an indication of a modification to the design application output file. In some implementations of the computing platform, the processor(s) may execute the instructions to automatically update one of the plurality of user interface components or one or more of the plurality of style attributes in response to the indication of the modification to the design application output file.

In some implementations of the computing platform, the processor(s) may execute the instructions to obtain modification data associated with one or more modifications to the design application output file. In some implementations of the computing platform, the processor(s) may execute the instructions to automatically update one of the plurality of user interface components or one or more of the plurality of style attributes based on the modification data.

In some implementations of the computing platform, the processor(s) may execute the instructions to provide an output file verification user interface component, the actuation of which is configured to initiate verification of whether the design application output file has been modified.

In some implementations of the computing platform, the processor(s) may execute the instructions to periodically query the design application output file to determine whether the design application output file has been modified.

In some implementations of the computing platform, verification of whether the style dictionary may have been modified includes determining whether a style dictionary file attribute has been modified or whether style dictionary file contents have been modified.

In some implementations of the computing platform, the processor(s) may execute the instructions to extract the style attributes from the design application output file.

In some implementations of the computing platform, the processor(s) may execute the instructions to provide a user interface to obtain data associated with the design application output file.

In some implementations of the computing platform, the data associated with the design application output file may include a uniform resource locator associated with the design application output file.

In some implementations of the computing platform, the processor(s) may execute the instructions to translate the style attributes from a design application format into a format compatible with the motion graphics project.

In some implementations of the computing platform, the processor(s) may execute the instructions to automatically translate the style attributes based on stored relationship data linking the design application format to the format compatible with the motion graphics project.

In some implementations of the computing platform, the design application output file may include a style dictionary.

In some implementations of the computing platform, the processor(s) may execute the instructions to generate the style application instructions based on data associated with the selection of the one or more of the plurality of user interface components.

In some implementations of the computing platform, the processor(s) may execute the instructions to provide the user interface such that the style attributes in the style dictionary are visually associated with a style application attribute in a format compatible with the motion graphics project.

In some implementations of the computing platform, the processor(s) may execute the instructions to provide the user interface including a first set of user interface components configured to provide a first set of styles to be applied to the motion graphics project.

In some implementations of the computing platform, the processor(s) may execute the instructions to provide the user interface including a project element modification user interface component configured to modify one or more existing user interface components based on one or more of the plurality of style attributes.

In some implementations of the computing platform, the processor(s) may execute the instructions to provide the user interface including a project element creation user interface component configured to create one or more new user interface components based on one or more of the plurality of style attributes.

In some implementations of the computing platform, the processor(s) may execute the instructions to generate the style application instructions based on data associated with the selection of the one or more of the plurality of user interface components.

In some implementations of the computing platform, the processor(s) may execute the instructions to output the style application instructions for application of the one or more of the plurality of style attributes to a plurality of motion graphics elements within the motion graphics project.

In some implementations of the computing platform, the processor(s) may execute the instructions to apply the one or more of the plurality of style attributes to a plurality of motion graphics elements within the motion graphics project.

In some implementations of the computing platform, the design application output file may include a style dictionary.

In some implementations of the computing platform, the design application output file may include a Figma design file.

In some implementations of the computing platform, the method may be performed by a plug-in associated with the motion graphics application.

In some implementations of the computing platform, the motion graphics application may include Adobe After Effects.

What is claimed is:

1. A system configured for enabling application of design styles to a motion design, the system comprising:

a non-transitory computer-readable storage medium having executable instructions embodied thereon; and one or more hardware processors configured to execute the instructions to:

obtain a design application output file for use with a motion graphics application, the design application output file defining a first plurality of style attributes;

translate the first plurality of style attributes defined in the design application output file into a second plurality of style attributes, wherein the first plurality of style attributes are defined in relation to a first data format associated with a design application, and wherein the second plurality of style attributes are defined in relation to a second data format used by the motion graphics application;

provide a user interface associated with the motion graphics application, the user interface visually presenting a plurality of user interface components each associated with one or more of the second plurality of style attributes;

receive, via a style panel of the user interface, a user selection of at least one of the plurality of user interface components, wherein the user selection corresponds to updating one or more style attributes of the first plurality of style attributes;

generate style application instructions based on the user selection and corresponding one or more style attributes of the first plurality of style attributes, wherein the generating includes modifying the design application output file to include the updated one or more style attributes of the first plurality of style attributes;

receive, via the motion graphics application, a modification indication corresponding to the design application output file, the modification indication based on a detected change in a file size of the design application output file;

based on the modification indication, provide, via the user interface, a verification user interface component configured to initiate a verification process corresponding to whether the design application output file was modified; and in response to determining that the design application output file was modified, execute, via the motion graphics application, the style application instructions to apply one or more of the second plurality of style attributes to a plurality of motion graphics elements within a motion graphics project of the motion graphics application.

2. The system of claim 1, wherein the one or more hardware processors are further configured by the instructions to:

automatically update one of the plurality of user interface components in response to the modification indication corresponding to the design application output file.

3. The system of claim 2, wherein the one or more hardware processors are further configured by the instructions to:

obtain modification data associated with one or more modifications to the design application output file;

automatically update one of the plurality of user interface components or one or more of the second plurality of style attributes based on the modification data.

4. The system of claim 1, wherein the one or more hardware processors are further configured by the instructions to:

provide an output file verification user interface component, an actuation of which is configured to initiate verification of whether the design application output file has been modified.

5. The system of claim 1, wherein the one or more hardware processors are further configured by the instructions to:

periodically query the design application output file to determine whether the design application output file has been modified.

6. The system of claim 1, wherein the one or more hardware processors are further configured by the instructions to:

filter the second plurality of style attributes based on one or more criteria.

7. The system of claim 6, wherein the one or more criteria includes at least one of: a non-grouped criteria, a background criteria, a body criteria, a fill criteria, a foreground criteria, and a heading criteria.

8. The system of claim 1, wherein the one or more hardware processors are further configured by the instructions to:

provide the user interface such that the one or more style attributes in a style dictionary are visually associated with a style application attribute in a format compatible with the motion graphics project.

9. The system of claim 1, wherein the one or more hardware processors are further configured by the instructions to:

output the style application instructions for application of the one or more of the second plurality of style attributes to a plurality of motion graphics elements within the motion graphics project.

10. A computer-implemented method of enabling application of design styles to a motion design, the method comprising:

obtaining a design application output file for use with a motion graphics application, the design application output file defining a first plurality of style attributes;

translating the first plurality of style attributes defined in the design application output file into a second plurality of style attributes, wherein the first plurality of style attributes are defined in relation to a first data format associated with a design application, and wherein the second plurality of style attributes are defined in relation to a second data format used by the motion graphics application;

providing a user interface associated with the motion graphics application, the user interface visually presenting a plurality of user interface components each associated with one or more of the second plurality of style attributes;

receiving, via a style panel of the user interface, a user selection of at least one of the plurality of user interface components, wherein the user selection corresponds to updating one or more style attributes of the first plurality of style attributes;

generating style application instructions based on the user selection and corresponding one or more style attributes of the first plurality of style attributes, wherein the generating includes modifying the design application output file to include the updated one or more style attributes of the first plurality of style attributes;

receiving, via the motion graphics application, a modification indication corresponding to the design application output file, the modification indication based on a detected change in a file size of the design application output file;

based on the modification indication, providing, via the user interface, a verification user interface component configured to initiate a verification process corresponding to whether the design application output file was modified; and in response to determining that the design application output file was modified, executing, via the motion graphics application, the style application instructions to apply one or more of the second plurality of style attributes to a plurality of motion graphics elements within a motion graphics project of the motion graphics application.

11. The method of claim 10, further comprising:

automatically updating one of the plurality of user interface components in response to the modification indication corresponding to the design application output file.

12. The method of claim 11, further comprising:

obtaining modification data associated with one or more modifications to the design application output file; and automatically updating one of the plurality of user interface components or one or more of the second plurality of style attributes based on the modification data.

13. The method of claim 10, further comprising:

providing an output file verification user interface component, an actuation of which is configured to initiate verification of whether the design application output file has been modified.

14. The method of claim 10, further comprising:

periodically querying the design application output file to determine whether the design application output file has been modified.

15. The method of claim 10, further comprising:

filtering the second plurality of style attributes based on one or more criteria.

16. The method of claim 15, wherein the one or more criteria includes at least one of: a non-grouped criteria, a background criteria, a body criteria, a fill criteria, a foreground criteria, and a heading criteria.

17. The method of claim 10, further comprising:

providing the user interface such that the style attributes in a style dictionary are visually associated with a style application attribute in a format compatible with the motion graphics project.

18. The method of claim 10, further comprising:

outputting the style application instructions for application of the one or more of the second plurality of style attributes to a plurality of motion graphics elements within the motion graphics project.

19. A non-transitory computer-readable storage medium having instructions embodied thereon, the instructions being executable by one or more processors to perform a method for enabling application of design styles to a motion design, the method comprising:

obtaining a design application output file for use with a motion graphics application, the design application output file defining a first plurality of style attributes;

translating the first plurality of style attributes defined in the design application output file into a second plurality of style attributes, wherein the first plurality of style attributes are defined in relation to a first data format associated with a design application, and wherein the second plurality of style attributes are defined in relation to a second data format used by the motion graphics application;

providing a user interface associated with the motion graphics application, the user interface visually presenting a plurality of user interface components each associated with one or more of the second plurality of style attributes;

receiving, via a style panel of the user interface, a user selection of at least one of the plurality of user interface components, wherein the user selection corresponds to updating one or more style attributes of the first plurality of style attributes;

generating style application instructions based on the user selection and corresponding one or more style attributes of the first plurality of style attributes, wherein the generating includes modifying the design application output file to include the updated one or more style attributes of the first plurality of style attributes;

receiving, via the motion graphics application, a modification indication corresponding to the design application output file, the modification indication based on a detected change in a file size of the design application output file;

based on the modification indication, providing, via the user interface, a verification user interface component configured to initiate a verification process corresponding to whether the design application output file was modified; and in response to determining that the design application output file was modified, executing, via the motion graphics application, the style application instructions to apply one or more of the second plurality of style attributes to a plurality of motion graphics elements within a motion graphics project of the motion graphics application.

20. The non-transitory computer-readable storage medium of claim 19, wherein the method further comprises:

automatically updating one of the plurality of user interface components or one or more of the second plurality of style attributes in response to the indication of the modification to the design application output file.

* * * * *